United States Patent [19]

Takatsuki et al.

[11] Patent Number: 4,996,622
[45] Date of Patent: Feb. 26, 1991

[54] MAGNETIC DISK WITH TEXTURED AREA ON PART OF DISK

[75] Inventors: Nobuyuki Takatsuki, Yokkaichi; Kyoichi Shukuri, Yokohama, both of Japan

[73] Assignee: Nippon Sheet Glass Co., Ltd., Osaka, Japan

[21] Appl. No.: 451,789

[22] Filed: Dec. 18, 1989

[30] Foreign Application Priority Data

Mar. 16, 1988 [JP] Japan ................................ 63-34816

[51] Int. Cl.$^5$ ............................................. G11B 5/82
[52] U.S. Cl. .................................................. 360/135
[58] Field of Search ............................... 360/133, 135

[56] References Cited

U.S. PATENT DOCUMENTS 4,152,487 5/1979 Yanagisawa ................. 360/135 X
4,738,885 4/1988 Matsumoto ................... 360/135 X Primary Examiner—A. J. Heinz
Attorney, Agent, or Firm—Jones, Day, Reavis & Pogue

[57] ABSTRACT

A magnetic disk in which a texture is formed in a first region spaced apart from an opening formed in a glass substrate by a predetermined distance, and a lubricant is coated on only the texture. The texture is not formed in a second region serving as a data surface, and an undercoating film, a magnetic recording film, and a protective film are sequentially coated on the surface of the glass substrate. In this magnetic disk, a floating amount of a magnetic head can be set to be small, and high-density data can be recorded. The data surface can be free from contamination by dust.

10 Claims, 2 Drawing Sheets

MAGNETIC DISK WITH TEXTURED AREA ON PART OF DISK

BACKGROUND OF THE INVENTION

The present invention relates to a magnetic disk which achieves high recording density.

FIG. 1 shows an arrangement of a conventional magnetic disk.

An aluminum substrate 2 is used as a substrate of a magnetic disk 1. A texture 3 is formed on the entire surface of the aluminum substrate 2. Films such as a magnetic recording film are formed on the texture 3. A lubricant 4 is coated on the entire surface of the magnetic recording film. Reference numeral 5 denotes an opening formed in a central portion of the aluminum substrate 2.

The texture 3 is formed because the texture 3 serving as a surface structure of the aluminum substrate 2 has a significant influence on "contact start stop" characteristics between the magnetic disk 1 and a magnetic head (not shown) and electromagnetic conversion characteristics.

For example, only a very small gap is formed between the magnetic disk 1 and the magnetic head. Therefore, when the magnetic disk 1 and the magnetic head are stopped relative to each other, they are substantially in contact with each other. When the magnetic disk 1 is rotated and driven, they tend to stick each other. However, this sticking state must be reliably released. For this reason, the texture 3 is formed on the aluminum substrate 2 in conventional techniques.

In such a conventional magnetic disk 1, however, the texture 3 is formed, and smoothness of the aluminum substrate 2 is low. Therefore, considerable waviness is present on a surface of the aluminum substrate 2. For this reason, during an operation of the magnetic disk apparatus, a gap formed between the magnetic disk 1 and the magnetic head cannot be set to be smaller. In other words, in the conventional aluminum substrate 2, a floating amount of the magnetic head cannot be decreased. As a result, recording density cannot be increased.

In addition, a lubricant is coated on the entire surface of a data surface of the magnetic disk 1. For this reason, dust tends to attach to the data surface.

SUMMARY OF THE INVENTION

The present invention has been made to solve the above problems, and has as its object to provide a magnetic disk which achieves high recording density by decreasing a floating amount of a magnetic head utilizing smoothness of a glass surface of a glass substrate, and protects a data surface from dust.

In order to achieve the above object, according to the present invention, there is provided a magnetic disk in which an undercoating film, a magnetic recording film, and a protective film are sequentially coated on a glass substrate, wherein a texture is formed in a predetermined first region from an opening formed in a central portion of the magnetic disk, and a lubricant is coated on only the texture, but a texture is not formed in a second region except for the first region.

In the present invention, a glass substrate is used as a substrate of the magnetic disk. The texture is formed in the predetermined first region on the opening side of the magnetic disk. In addition, a lubricant is coated on only the texture. In a region except for the first region, films such as a magnetic recording film are formed without forming a texture. For this reason, smoothness of a glass surface of the glass substrate can be utilized to set a small floating amount of the magnetic head.

According to the present invention, a glass substrate is used as a substrate, and films such as a magnetic recording film are formed in the second region serving as a data surface of the glass substrate without forming a texture. Therefore, a floating amount of the magnetic head can be set to be small, thus improving recording density of data.

In addition, since a lubricant is not coated on the data surface of the magnetic disk, the data surface is free from contamination by dust.

DETAILED DESCRIPTION OF THE PREFERRED EMBODIMENT

A magnetic disk according to an embodiment of the present invention will be described hereinafter with reference to the accompanying drawings.

Figure 1:
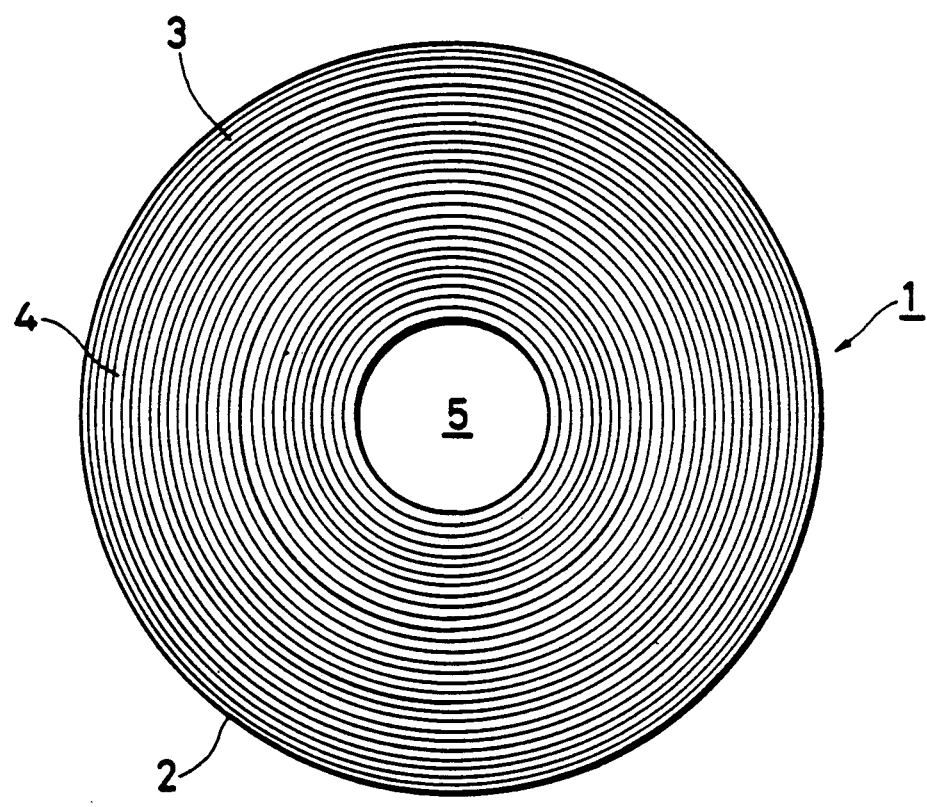
FIG. 1 is a front view showing a magnetic disk according to a prior art.
Figure 2:
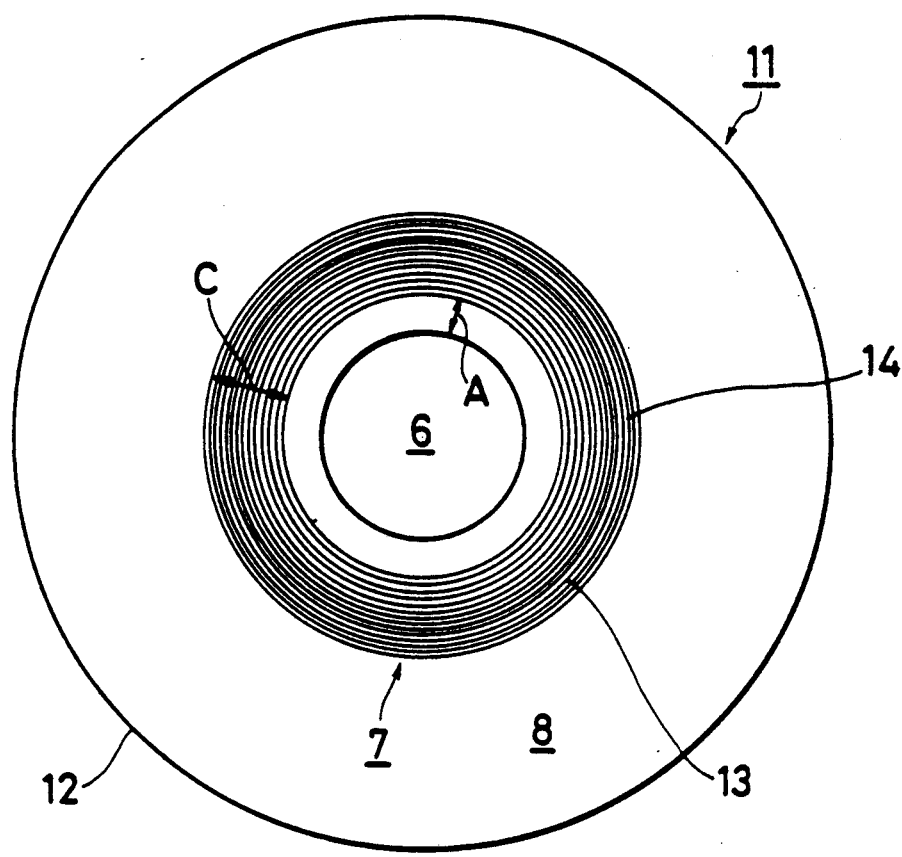
FIG. 2 is a front view showing a magnetic disk according to an embodiment of the present invention.
Figure 3:
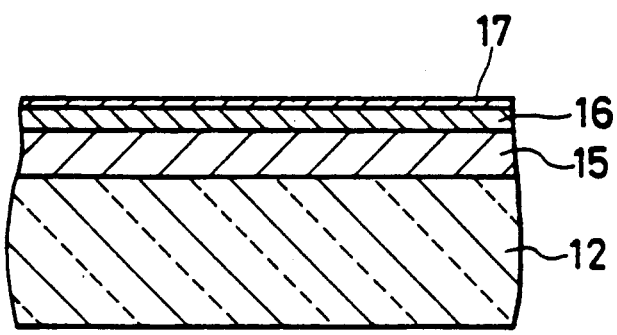
FIG. 3 is a partially sectional view of the embodiment shown in FIG. 1.

FIGS. 2 and 3 are front and partially sectional views of a magnetic disk according to an embodiment of the present invention.

Referring to FIG. 2, a glass substrate 12 is used as a substrate of a magnetic disk 11. An opening 6 is formed in a central portion of the glass substrate 12. A texture 13 is formed in a region 7 spaced apart from the opening 6 by a predetermined distance A. For example, a surface of the glass substrate 12 is subjected to a roughening treatment with a "fixed abrasive grain" or a "substance obtained by combining a free (liquid) abrasive grain and a pad" to form the texture 13. The texture 13 has a function for releasing a sticking state of the magnetic disk 11 and a magnetic head.

A radial width C of the region 7 can be set within the range of, e.g., 5 mm to 10 mm. The roughness of a surface of the region 7 can be set as follows. For example, a central line average roughness Ra falls within the range of 2 nm to 20 nm, and a maximum height Rmax falls within the range of 20 nm to 200 nm.

Note that the central line average roughness Ra represents an average value of the vertical magnitudes with respect to the central line of a roughness curve (cross-sectional curve). The maximum height Rmax represents an interval between two lines parallel to an average line when a portion to be measured is defined by the two lines. In addition, a region 8 serving as a data surface is formed outside the region 7. A texture is not formed in the region 8.

As shown in FIG. 3, an undercoating film 15 consisting of, e.g., Cr or Ni—P is formed on the entire surface of the glass substrate 12. A magnetic recording film 16 consisting of, e.g., Co—Ni—Cr, Co—Ni, or Co—Ni—P is formed on the undercoating film 15. In addition, a protective film 17 consisting of, e.g., carbon or $SiO_2$ is formed on the magnetic recording film 16. These films 15, 16, and 17 can be formed by, e.g., sputtering. Note that the magnetic recording film 16 is formed on the undercoating film 15 because this structure achieves good crystallinity of the magnetic recording film 16. The roughness of the data surface (region 8) thus formed is given such that the central line average roughness Ra falls within the range of about 1 nm to 10 nm, and the maximum height Rmax falls within the range of about 10 nm to 100 nm.

A lubricant 14 (e.g., fluorocarbon) is coated on the protective film 17 formed on the texture 13. This is because the lubricant 14 decreases a friction coefficient between the protective film 17 of the magnetic disk 11 and the magnetic head. As a result, a load of a drive motor (not shown) is decreased, and the protective film 17 can be protected from a damage caused by the magnetic head.

For example, the lubricant (oil) 14 is partially coated by the following method. That is, a belt-like cloth having the same width as the texturing width C is impregnated with the lubricant 14, and the cloth is pressed against the glass media. A coating amount can be controlled by properly setting a press time, a press force, and a diluting concentration of the lubricant 14. If the lubricant 14 is excessively coated, the extra lubricant is removed by a cloth without being impregnated with the lubricant 14 to control the coating amount.

Thus, the amount of the partially coated lubricant 14 may be measured by an ESCA (electron spectroscopy for chemical analysis) so as to control the amount to correspond to the thickness of the coating layer which falls within the range of 1 nm to 15 nm. Such an amount does not cause stiction between the magnetic disk and the magnetic head, and CSS (contact start stop) durability can be improved. When a CSS test was performed with a magnetic head consisting of Al—Ti—C, friction of co—ef $\leq$ 0.6 and stiction of co—ef $\leq$ 1.0 after the CSS test was repeated 30,000 times.

Note that the lubricant was not coated on the data surface.

An operation with the above structure will be described below.

In this embodiment, the glass substrate 12 is used as a substrate of the magnetic disk 11. In the region 8 serving as the data surface, the films such as the magnetic recording film 16 are formed without forming the texture 13. Therefore, the roughness of the data surface is given such that the central line average roughness Ra falls within the range of 1 nm to 10 nm, and the maximum height Rmax falls within the range of 10 nm to 100 nm. For this reason, good smoothness of the surface of the glass substrate 12 can be utilized.

Therefore, a floating amount of the magnetic head can be decreased, and hence high-density data can be recorded.

In addition, since the lubricant 14 is not coated on the data surface, the data surface can be free from contamination by dust.

Note that the roughness of the surface of the portion on which the texture 13 is formed is given such that the central line average roughness Ra falls within the range of 2 nm to 20 nm, and the maximum height Rmax falls within the range of 20 nm to 200 nm. For this reason, a sticking state of the magnetic disk 11 and the magnetic head can be reliably released.

Note that a case wherein the texture 13 and the films 15, 16, and 17 are formed on only one surface of the glass substrate 12 has been described in this embodiment. However, the above texture and the above films can be formed on both surfaces of the glass substrate.

What is claimed is:

1. A magnetic disk comprising a glass substrate with an opening in a central portion, an undercoating film formed on said glass substrate, a magnetic recording film formed on said undercoating film, and a protective film formed on said magnetic recording film, wherein a texture is formed in a first region spaced apart from said opening by a predetermined distance, and a lubricant is coated on only said texture.

2. A magnetic disk according to claim 1, including a second region except for said first region, said second region not being provided with a texture.

3. A magnetic disk according to claim 1 or claim 2, a radial width of said first region is set within the range of 5 mm to 10 mm.

4. A magnetic disk according to claim 1 or claim 2, a roughness of a surface of said first region is given such that a central line average roughness Ra falls within the range of 2 nm to 20 nm, and a maximum height Rmax falls within the range of 20 nm to 200 nm.

5. A magnetic disk according to claim 1, wherein said undercoating film consists of at least one member selected from the group consisting of Cr and Ni—P, and is formed on the entire surface of said glass substrate.

6. A magnetic disk according to claim 1, wherein said magnetic recording film consists of at least one member selected from the group consisting of Co—Ni—Cr, Co—Ni, and Co—Ni—P, and is formed on the surface of said undercoating film.

7. A magnetic disk according to claim 1, wherein said protective film consists of at least one member selected from the group consisting of carbon and $SiO_2$, and is formed on the entire surface of said magnetic recording film.

8. A magnetic disk according to claim 1, wherein said lubricant consists of fluorocarbon, and is coated on said protective film formed on said texture.

9. A magnetic disk according to claim 1, wherein a thickness of a coating layer of said lubricant is set within the range of 1 nm to 15 nm.

10. A magnetic disk according to claim 2, wherein a data surface is formed in said second region, and a roughness of a surface of said data surface is given such that a central line average roughness Ra falls within the range of 1 nm to 10 nm, and a maximum height Rmax falls within the range of 10 nm to 100 nm.

* * * * *